US012243455B2

(12) United States Patent
Bi

(10) Patent No.: US 12,243,455 B2
(45) Date of Patent: Mar. 4, 2025

(54) METHOD FOR ADJUSTING GHOSTING REDUCTION POTENTIAL, ROW DRIVING CIRCUIT AND LED DISPLAY DEVICE

(71) Applicant: Chipone Technology (Beijing) Co., Ltd., Beijing (CN)

(72) Inventor: Qian Bi, Beijing (CN)

(73) Assignee: CHIPONE TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 18/021,170

(22) PCT Filed: Dec. 17, 2020

(86) PCT No.: PCT/CN2020/137357
§ 371 (c)(1),
(2) Date: Feb. 13, 2023

(87) PCT Pub. No.: WO2022/032953
PCT Pub. Date: Feb. 17, 2022

(65) Prior Publication Data

US 2023/0316963 A1 Oct. 5, 2023

(30) Foreign Application Priority Data

Aug. 12, 2020 (CN) ......................... 202010809984.3

(51) Int. Cl.
*G09G 3/32* (2016.01)
*G09G 3/00* (2006.01)
*G09G 3/20* (2006.01)

(52) U.S. Cl.
CPC ........... *G09G 3/006* (2013.01); *G09G 3/2096* (2013.01); *G09G 3/32* (2013.01);
(Continued)

(58) Field of Classification Search
CPC .. G09G 3/006; G09G 2320/0233; G09G 3/32; G09G 2300/06
See application file for complete search history.

(56) References Cited

U.S. PATENT DOCUMENTS

| | | | | |
|---|---|---|---|---|
| 6,710,794 B1 | | 3/2004 | Yamazaki et al. | |
| 2010/0013825 A1* | | 1/2010 | Takahashi ............ | G09G 3/3216 345/76 |

(Continued)

FOREIGN PATENT DOCUMENTS

| | | |
|---|---|---|
| CN | 102708802 A | 10/2012 |
| CN | 103871355 A | 6/2014 |

(Continued)

*Primary Examiner* — Yuzhen Shen
(74) *Attorney, Agent, or Firm* — Treasure IP Group, LLC

(57) ABSTRACT

Disclosed is a method for adjusting a ghost reduction potential, a row driving circuit and an LED display device. The method is realized by a row driver module, and comprises: receiving, by a row driver chip, an open-circuit detection signal and a short-circuit detection signal from a row driving side of an LED display panel; according to the open-circuit detection signal and the short-circuit detection signal, by the row driver chip, generating a control signal and transmitting the control signal to a multiplexer, thereby controlling the multiplexer to select only the first/second voltage as the ghost reduction potential, select the first voltage and the second voltage as the ghost reduction potential in sequence, or select the second voltage and the first voltage as the ghost reduction potential in sequence, which efficiently solves constant bright problems caused by an open-circuited/short circuited LED lamp bead, i.e., solving open-circuit/short-circuit caterpillar phenomenon.

17 Claims, 10 Drawing Sheets

(52) U.S. Cl.
CPC ............... *G09G 2310/0297* (2013.01); *G09G 2320/0257* (2013.01); *G09G 2330/028* (2013.01); *G09G 2330/08* (2013.01); *G09G 2330/12* (2013.01)

(56) References Cited

U.S. PATENT DOCUMENTS

| | | | | |
|---|---|---|---|---|
| 2014/0347255 | A1* | 11/2014 | Chiu | G09G 3/32 345/82 |
| 2018/0090048 | A1* | 3/2018 | Tang | G09G 3/2018 |
| 2019/0147795 | A1 | 5/2019 | Yao | |
| 2020/0320925 | A1* | 10/2020 | Luo | G09G 3/32 |

FOREIGN PATENT DOCUMENTS

| | | | | |
|---|---|---|---|---|
| CN | 104183214 | | 12/2014 | |
| CN | 104599628 | | 5/2015 | |
| CN | 105825806 | A * | 8/2016 | G09G 3/006 |
| CN | 205810342 | A | 12/2016 | |
| CN | 107274818 | A | 10/2017 | |
| CN | 108898989 | A | 11/2018 | |
| CN | 110415639 | | 11/2019 | |
| CN | 110415643 | | 11/2019 | |
| CN | 111883049 | A | 11/2020 | |
| JP | 2015031744 | A | 2/2015 | |

* cited by examiner

METHOD FOR ADJUSTING GHOSTING REDUCTION POTENTIAL, ROW DRIVING CIRCUIT AND LED DISPLAY DEVICE

CROSS-REFERENCE TO RELATED APPLICATION

The present application is a Section 371 National Stage application of International Application No. PCT/CN2020/137357, which is filed on 17 Dec. 2020 and published as WO/2022/032953 A1 on 17 Feb. 2022, and claims priority to a Chinese patent application No. 202010809984.3, filed with the China National Intellectual Property Administration on Aug. 12, 2020, entitled "Method for Adjusting Ghost Reduction Potential, Row Driving Circuit and LED Display Device", which is are incorporated herein by reference in entirety their entireties.

FIELD OF THE DISCLOSURE

The present application relates to a technical field of LED display driving circuits, in particular to a method for adjusting a ghost reduction potential, a row driving circuit and an LED display device.

DESCRIPTION OF THE RELATED ART

In the prior art, flat panel displays comprise non-self-luminous flat panel displays and self-luminous flat panel displays, wherein, a liquid crystal display (LCD) is a non-self-luminous flat panel display that has been used for a long time, and an organic light-emitting diode (OLED) display and a light-emitting diode (LED) display are self-luminous flat panel displays that are widely used at present. Compared with the liquid crystal display, an LED display has many advantages, including: high refresh rate, high contrast, wide viewing angle, low power consumption and so on.

However, most LED display panels in the prior art are prone to "caterpillar" phenomenon, which is a phenomenon that when one or more LED component of an LED display panel are damaged, resulting in short-circuiting or open-circuiting a lamp bead, other lamp beads which are arranged in a same row or column with that lamp bead may be affected to produce erroneous dim light. This "caterpillar" phenomenon greatly affects visual effect, thus affecting user experience.

SUMMARY

According to embodiments of the present disclosure, a method for adjusting a ghost reduction potential is provided, and can effectively avoid open-circuit caterpillar phenomenon or short-circuit caterpillar phenomenon in an LED display panel.

The present disclosure provides a method for adjusting a ghost reduction potential, which may be realized by a row driving circuit, wherein the row driving circuit comprises at least one row driver chip, each of which comprises a ghost reduction potential generation circuit configured to generate a first voltage and a second voltage, and ghost reduction potential generation circuit comprises a multiplexer; the method comprises:

receiving, by the at least one row driver chip, an open-circuit detection signal and a short-circuit detection signal from a row driving side of an LED display panel; and according to the open-circuit detection signal and the short-circuit detection signal, by the at least one row driver chip, generating a control signal and transmitting the control signal to the multiplexer, so as to control the multiplexer to select only the first voltage as the ghost reduction potential, select only the second voltage as the ghost reduction potential, select the first voltage and the second voltage as the ghost reduction potential in sequence, or select the second voltage and the first voltage as the ghost reduction potential in sequence, wherein at least one output channel of the at least one row driver chip is configured to output the ghost reduction potential to the row driving side of the LED display panel.

In an embodiment, the ghost reduction potential generation circuit further comprises a voltage generator unit, which is coupled with two signal input terminals of the multiplexer and configured to generate the first voltage and the second voltage and transmit the first voltage and the second voltage to the two signal input terminals, respectively.

In an embodiment, the at least one output channel of the row driver chip is configured to transmit the ghost reduction potential to at least one unscanned row on the row driving side, so as to adjust a voltage of each of the at least one unscanned row to $V_{DN}>V_{DD}-Vf$, thus eliminating short-circuit caterpillar phenomenon caused by at least one LED component which is short-circuited in the LED display panel, wherein, $V_{DD}$ is a scanning voltage, and Vf is a forward turn-on voltage of each LED component.

In an embodiment, the at least one output channel of the at least one row driver chip is configured to transmit the ghost reduction potential to at least one unscanned row on the row driving side, so as to adjust a potential of each of the at least one unscanned row to $V_{DN}<Vout+Vf$, thus eliminating open-circuit caterpillar phenomenon caused by at least one LED component which is open-circuited in the LED display panel, wherein Vout is an output voltage of a corresponding one of the at least one output channel.

In an embodiment, the multiplexer is controlled by the control signal to select only the first voltage as the ghost reduction potential when the open-circuit detection signal and the short-circuit detection signal indicate that only short-circuit caterpillar phenomenon exists in the LED display panel.

In an embodiment, the multiplexer is controlled by the control signal to select only the second voltage as the ghost reduction potential when the open-circuit detection signal and the short-circuit detection signal indicate that only open-circuit caterpillar phenomenon exists in the LED display panel.

In an embodiment, the multiplexer is controlled by the control signal to sequentially select the first voltage and the second voltage as the ghost reduction potential according to a predetermined priority when the open-circuit detection signal and the short-circuit detection signal indicate that short-circuit caterpillar phenomenon and open-circuit caterpillar phenomenon simultaneously exist in the LED display panel.

In an embodiment, if a priority of the first voltage is higher than a priority of the second voltage, the multiplexer is controlled by the control signal to select the first voltage and the second voltage as the ghost reduction potential in sequence when the open-circuit detection signal and the short-circuit detection signal indicate that short-circuit caterpillar phenomenon and open-circuit caterpillar phenomenon simultaneously exist in the LED display panel.

In an embodiment, if a priority of the second voltage is higher than a priority of the first voltage, the multiplexer is controlled by the control signal to select the second voltage and the first voltage as the ghost reduction potential in sequence when the open-circuit detection signal and the short-circuit detection signal indicate that short-circuit caterpillar phenomenon and open-circuit caterpillar phenomenon simultaneously exist in the LED display panel.

In an embodiment, the short-circuit detection signal is generated if a difference between the scanning voltage and an original voltage of the ghost reduction potential is greater than the forward turn-on voltage of each LED component.

In an embodiment, the open-circuit detection signal is generated if the output voltage of the output channel is lower than the forward turn-on voltage of each LED component.

The present disclosure also provides a row driving circuit, wherein the row driving circuit comprises at least one row driver chip, each of which comprises a ghost reduction potential generation circuit; the row driving circuit is configured to perform the method for adjusting the ghost reduction potential according to embodiments of the present disclosure.

In some embodiments, the ghost reduction potential generation circuit further comprises a voltage generator unit, which is coupled to the two signal input terminals of the multiplexer and is configured to generate the first voltage and the second voltage and transmit the first voltage and the second voltage to the two signal input terminals, respectively.

In some embodiment, the ghost reduction potential generation circuit further comprises a register configured to register the first voltage and the second voltage.

The present disclosure also provides an LED display device, which comprises an LED display panel, a column driving circuit, a row driving circuit and a display controller; wherein, the row driving circuit comprises at least one row driver chip, each of which comprises a ghost reduction potential generation circuit; the row driving circuit is configured to perform a method for adjusting a ghost reduction potential according to embodiments of the present disclosure.

In the above technical proposals according to embodiments of the present disclosure, the row driver chip is configured to receive an open-circuit detection signal and a short-circuit detection signal from the row driving side of the LED display panel; according to the open-circuit detection signal and the short-circuit detection signal, the row driver chip is configured to generate a control signal and transmit the control signal to the multiplexer, so as to control the multiplexer to select only the first voltage as the ghost reduction voltage, select only the second voltage as the ghost reduction potential, select the first voltage and the second voltage as the ghost reduction potential in sequence, or select the second voltage and the first voltage as the ghost reduction potential in sequence, thus at least one output channel of the row driver chip is configured to output the ghost reduction potential to the row driving side of the LED display panel, which can effectively avoid open-circuit caterpillar phenomenon or short-circuit caterpillar phenomenon in the LED display panel.

BRIEF DESCRIPTION OF THE DRAWINGS

In order to explain technical solutions according to the embodiments of the present disclosure more clearly, drawings corresponding to the embodiments of the present disclosure are briefly introduced below, wherein.

REFERENCE MARKS

Figure 1:
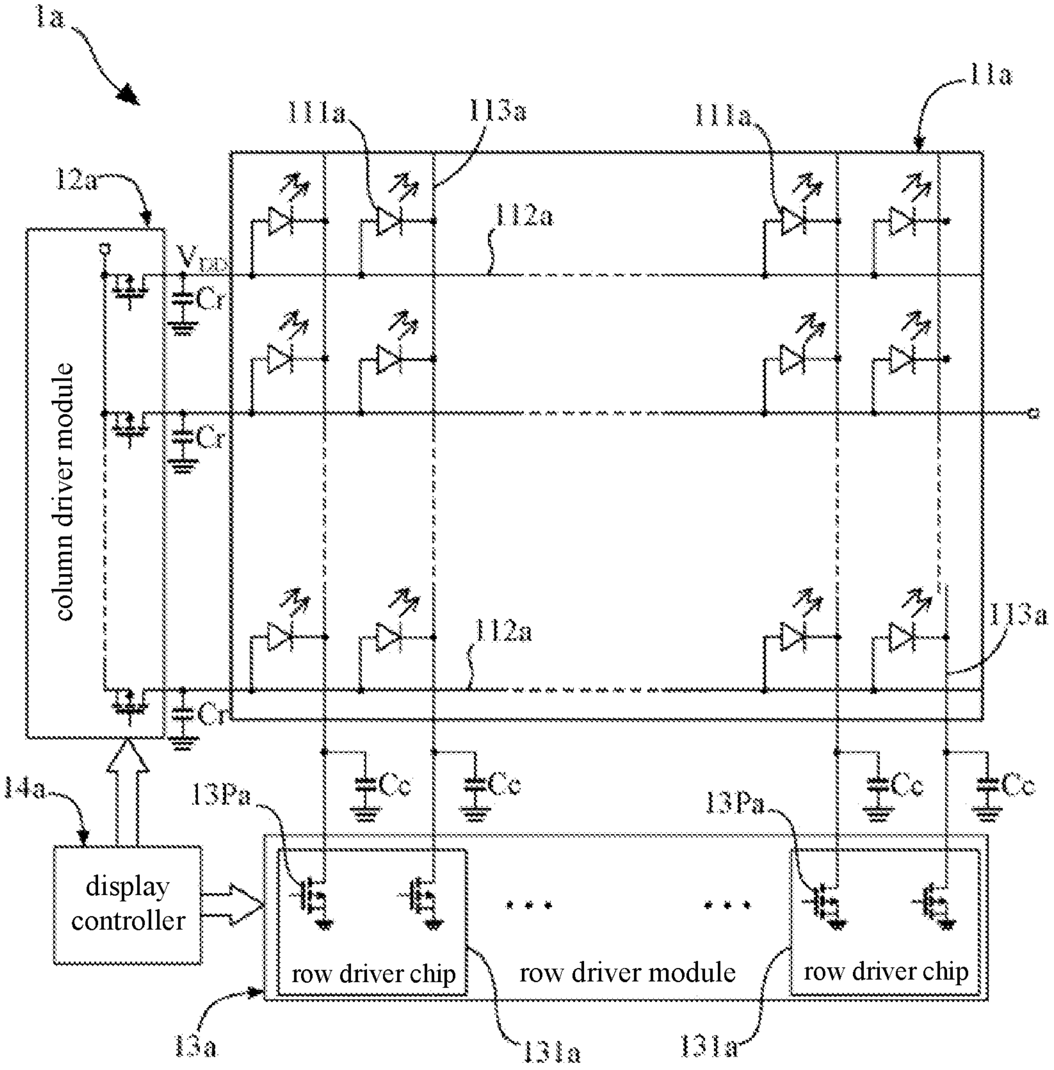
FIG. 1 shows a schematic diagram of an LED display in the prior art.

1—LED device; 11—LED display panel; 111—LED component; 112—column driving line; 113—row driving line; 12—column driving circuit; 13—row driving circuit; 131—row driver chip; 1310—ghost reduction potential generation circuit; 1311—voltage generator unit; 1312—multiplexer; 1313—register; 14—display controller.

DETAILED DESCRIPTION OF EMBODIMENTS OF THE DISCLOSURE

Technical solutions according to the embodiments of the present disclosure will be described below with reference to the drawings corresponding to the embodiments of the present disclosure.

Similar numerals and letters denote similar items in the drawings, and therefore, once an item is defined in one drawing, it does not need to be further defined and explained in a subsequent drawing. Meanwhile, in the description of the present disclosure, terms "first", "second" and the like are used only to distinguish descriptions and should not be understood to indicate or imply relative importance.

FIG. 1 shows a schematic diagram of an LED display in the prior art. As shown in FIG. 1, the LED display 1*a* includes an LED display panel 11*a*, a column driver module 12*a*, a row driver module 13*a* and a display controller 14*a* (timing controller). The row driver module 13*a* generally includes a plurality of row driver chips 131*a*, and the number of the plurality of row driver chips 131*a* in use is determined by a resolution of the LED display panel 11*a* and the number of output channels of the row driver chips 131*a*.

As shown in FIG. 1, the LED display panel 11*a* includes X×Y LED components 111*a*, X column driving lines 112*a*, and Y row driving lines 113*a*. It is worth noting that each of the column driving lines 112*a* has a column parasitic capacitor Cr and each of the row driving lines 113*a* has a row parasitic capacitor Cc. Under normal operation, the column parasitic capacitor Cr and/or the row parasitic capacitor Cc may affect display quality of the LED display 1*a* to a certain extent. Normally, in the prior art, a row driving component 13Pa (i.e., a PMOS component) of a row driver chip 131*a* is coupled to a pull-down circuit, and when a row switching operation is performed, the pull-down circuit generates a pull-down potential so that charges of the parasitic capacitor can be quickly released to achieve row ghost reduction effect.

Figure 2:
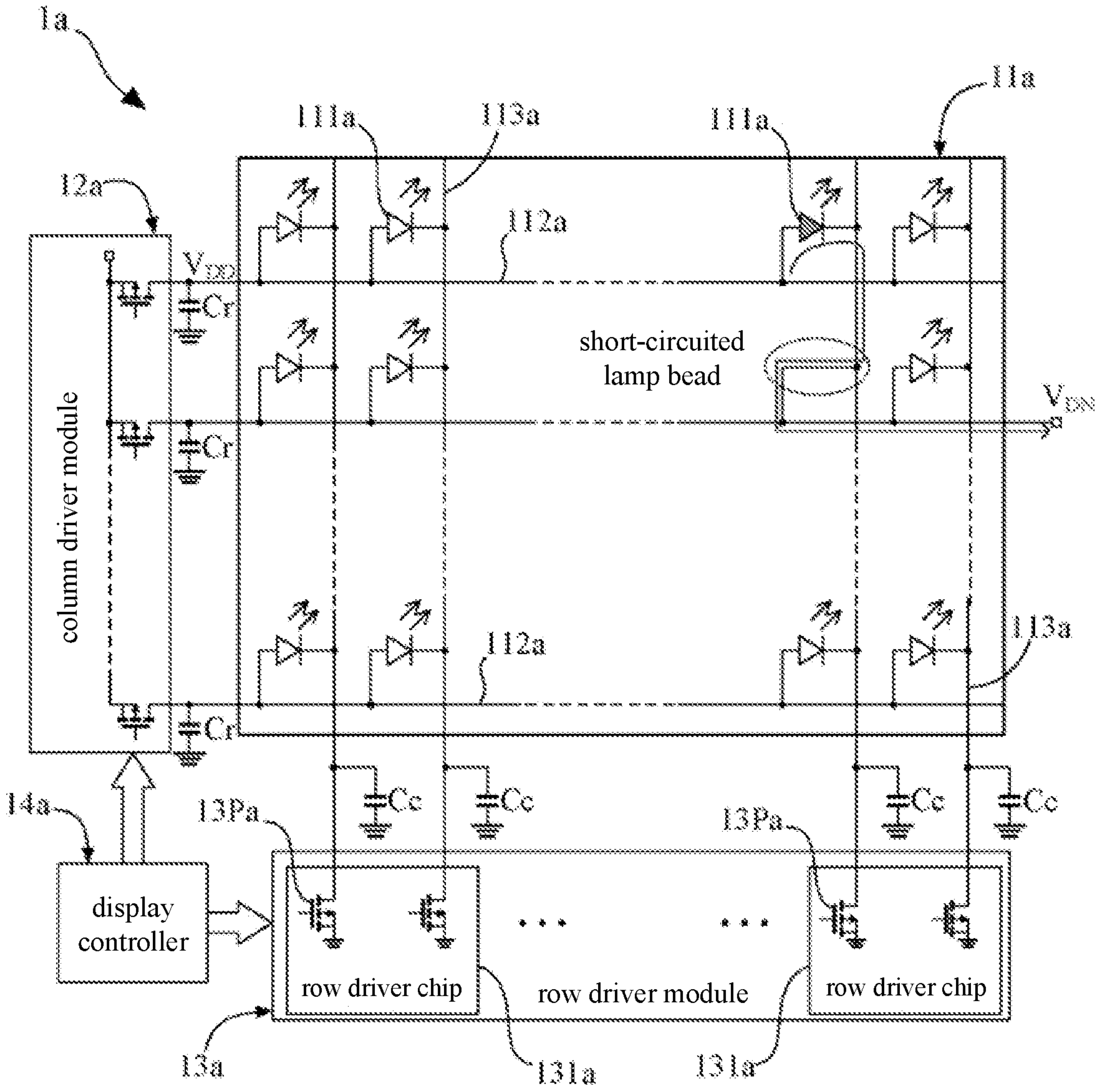
FIG. 2 shows short-circuit caterpillar phenomenon occurred in an LED display panel.

FIG. 2 shows short-circuit caterpillar phenomenon occurred in an LED display panel. When one or more LED component 111*a* of the LED display panel 11*a* is damaged, resulting in short-circuiting a lamp bead, other lamp beads which are arranged in a same row or column with that lamp bead (i.e., LED component 111*a*) may be affected to produce an erroneous dim light. This phenomenon is referred to as short-circuit caterpillar phenomenon in the industry. As shown in FIG. 2, when a lamp bead is short-circuited, an LED component 111*a* arranged in a same column with that lamp bead may form a path as shown in FIG. 2 when the row with that LED component 111*a* is under scanning; at this time, if a voltage difference between potential point $V_{DD}$ and potential point $V_{DN}$ is greater than a turn-on voltage of the LED component 111*a*, long bright phenomenon will occur on that column. Therefore, in order to avoid this problem, it is necessary to provide a ghost reduction potential in the circuit design of the row driver chip 131*a*, so that at least one output channel of the row driver chip 131*a* can achieve row ghost reduction effect.

Figure 3:
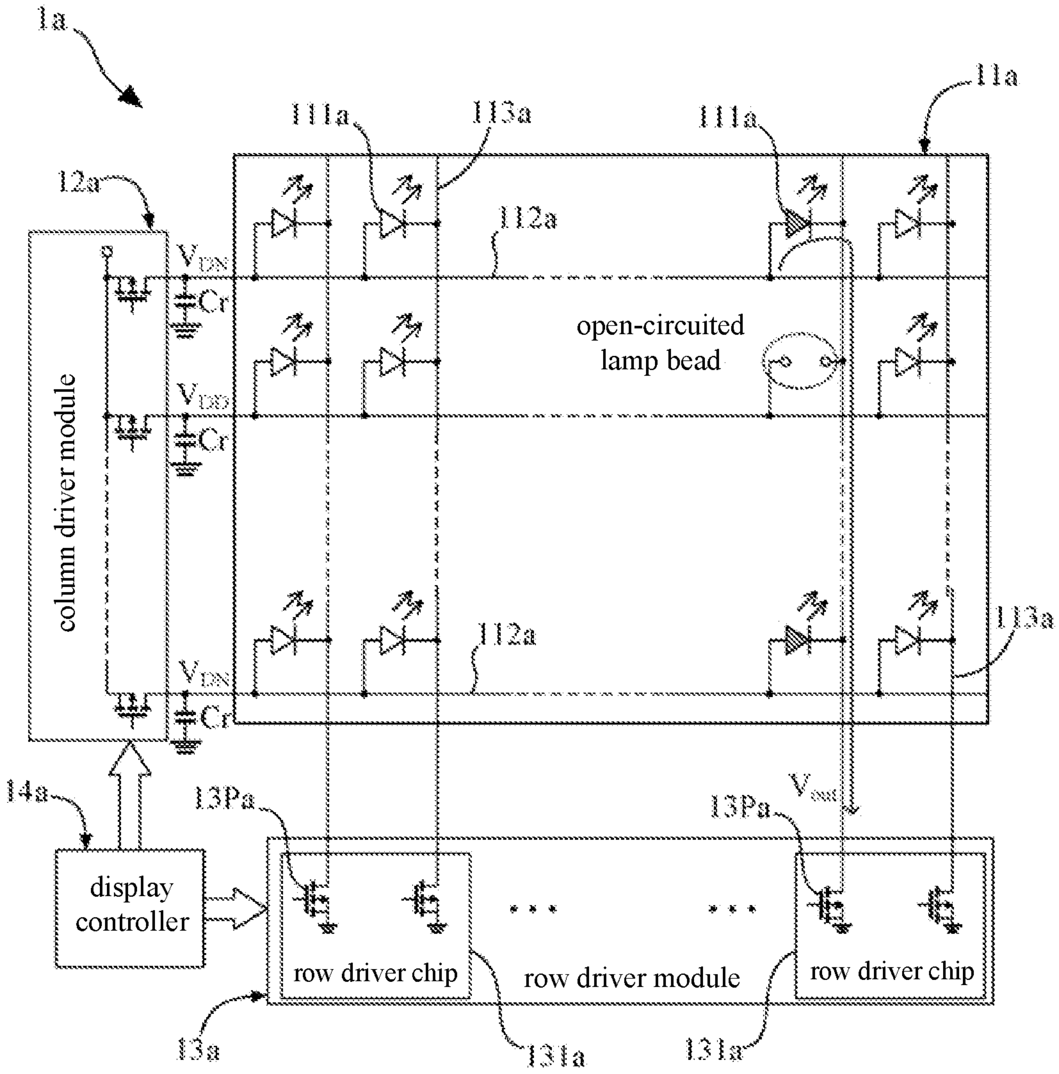
FIG. 3 shows open-circuit caterpillar phenomenon occurred in an LED display panel.

FIG. 3 shows open-circuit caterpillar phenomenon occurred in an LED display panel. When one or more LED component 111*a* of the LED display panel 11*a* is damaged, resulting in open-circuiting a lamp bead, other lamp beads which are arranged in a same row or column with that lamp bead (i.e., LED component 111*a*) may be affected to produce an erroneous dim light. This phenomenon is referred to as open-circuit caterpillar phenomenon in the industry. As shown in FIG. 3, when a lamp bead is open-circuited, turning that lamp bead (LED component 111*a*) on may pull the output voltage Vout of a corresponding output channel of the corresponding row driver chip 131*a* down to less than 0.5 V; at this time, a potential of an unscanned row is $V_{DN}$-Vout>Vf, so that other LED component 111*a*, which is arranged in a column adjacent to that lamp bead and in a same row with that lamp bead, may be turned on, thus forming an open-circuit caterpillar. Therefore, in order to avoid this problem, it is necessary to provide another ghost reduction potential in the circuit design of the row driver chip 131*a*, so that at least one output channel of the row driver chip 131*a* can achieve row ghost reduction effect.

From the above description, it can be seen that a new method for adjusting the ghost reduction potential is urgently expected in the technical field. Based on this, according to embodiments of the present disclosure, a method for adjusting a ghost reduction potential, a row driving circuit and an LED display device are provided, which can effectively avoid open-circuit caterpillar phenomenon or short-circuit caterpillar phenomenon in the LED display panel.

Figure 4:
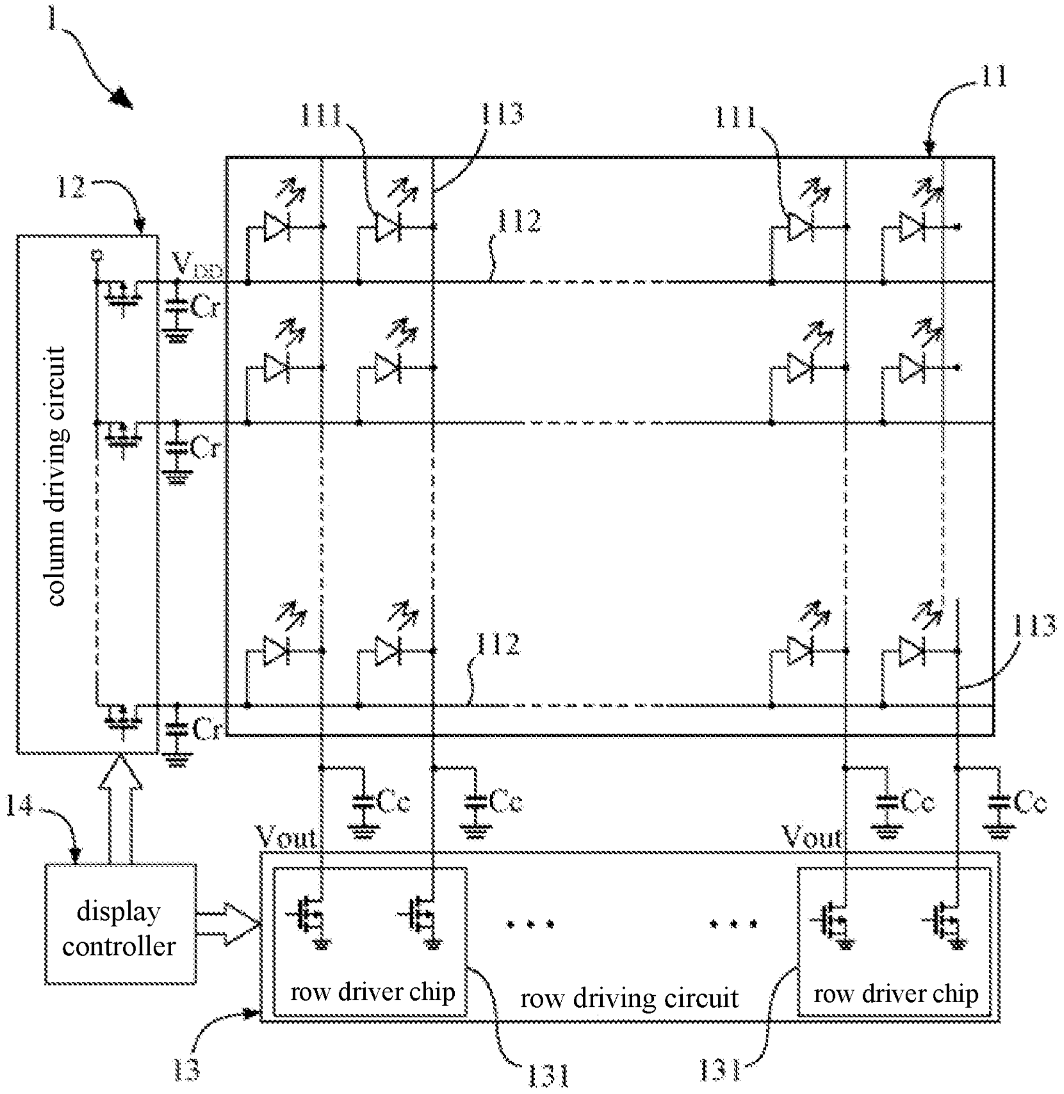
FIG. 4 shows a structural diagram of an LED display device according to an embodiment of the present disclosure.

FIG. 4 shows a structural schematic diagram of an LED display device provided according to an embodiment of the present disclosure. As shown in FIG. 4, the LED display device 1 includes an LED display panel 11, a column driving circuit 12, a row driving circuit 13, and a display controller 14 (or a timing controller). The row driving circuit 13 generally includes a plurality of row driver chips 131, and the number of the plurality of row driver chips 131 in use is determined by a resolution of the LED display panel 11 and the number of output channels of the row driver chips 131. On the other hand, the LED display panel 11 includes X×Y LED components 111, X column driving lines 112 and Y row driving lines 113. It is worth noting that each of the column driving lines 112 has a column parasitic capacitor Cr and each of the row driving lines 113 has a row parasitic capacitor Cc.

Figure 5:
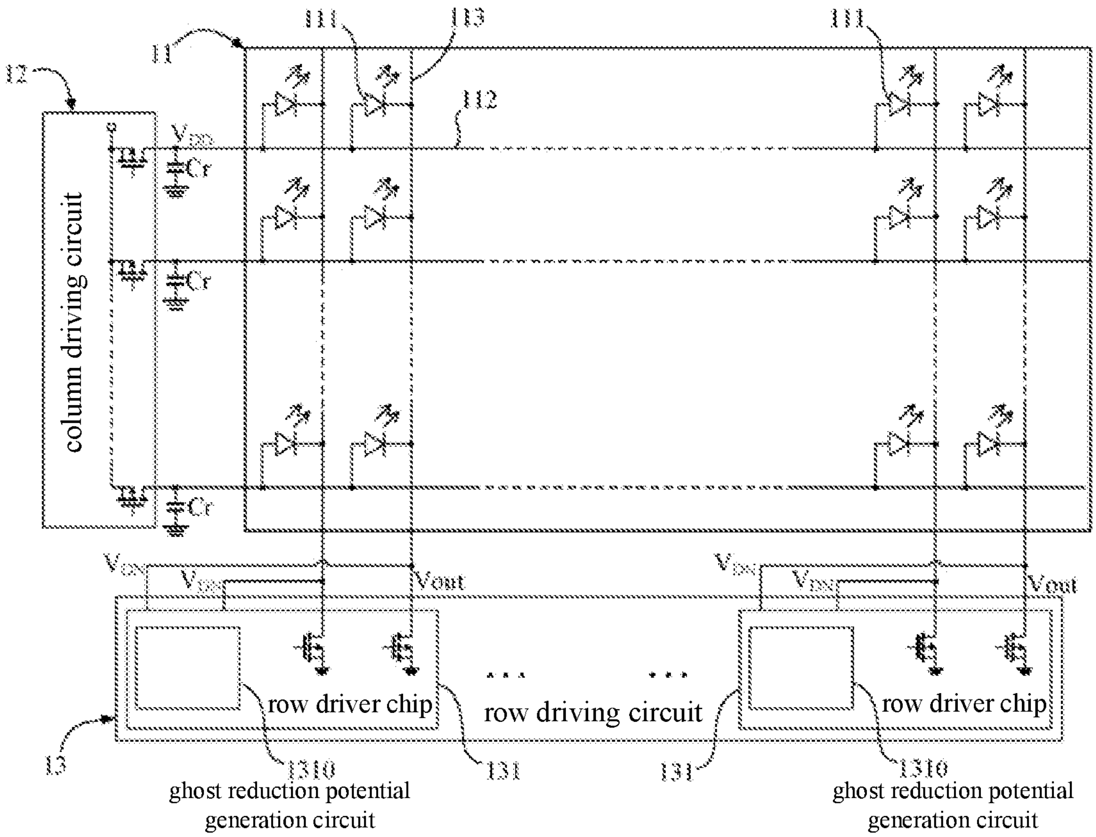
FIG. 5 shows a structural schematic diagram of an LED display panel, a column driving circuit and a row driving circuit according to an embodiment of the present disclosure.

FIG. 5 shows a structural schematic diagram of the LED display panel 11, the column driving circuit 12, and the row driving circuit 13 provided according to an embodiment of the present disclosure. A ghost reduction potential generation circuit 1310 is provided inside the row driver chip 131, and is configured to execute a method for adjusting the ghost reduction potential according to embodiments of the present disclosure.

Figure 6:
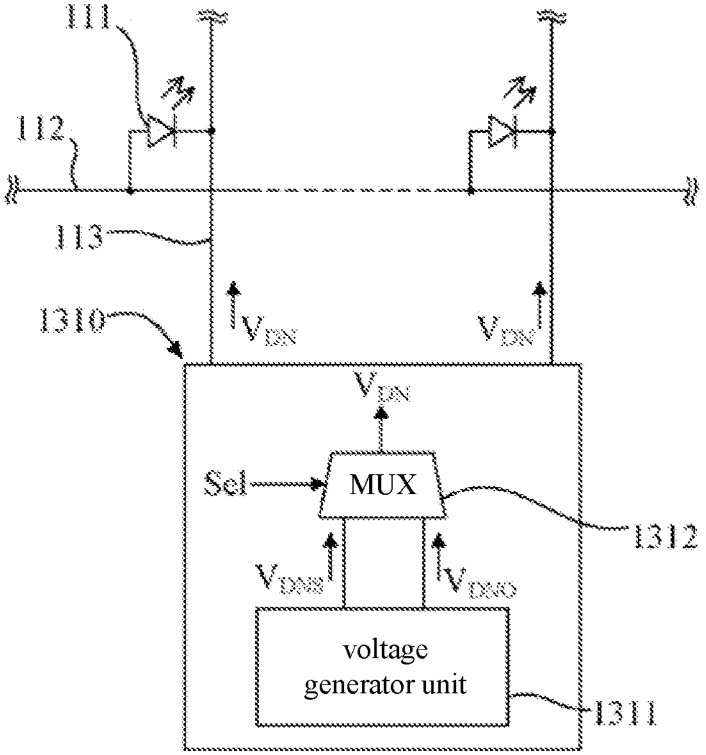
FIG. 6 shows a structural schematic diagram of a ghost reduction potential generation circuit according to an embodiment of the present disclosure.

FIG. 6 shows a structural schematic diagram of the ghost reduction potential generation circuit provided according to an embodiment of the present disclosure. As shown in FIG. 6, the ghost reduction potential generation circuit 1310 may include a voltage generator unit 1311 configured to generate a first voltage $V_{DNS}$ and a second voltage $V_{DNO}$ The ghost reduction potential generation circuit 1310 may also include a multiplexer 1312 which includes two signal input terminals, a control terminal and a signal output terminal. The two signal input terminals of the multiplexer 1312 are coupled to an output of the first voltage $V_{DNS}$ and an output of the second voltage $V_{DNO}$, respectively, and the control terminal is configured to receive a control signal Sel.

Figure 7:
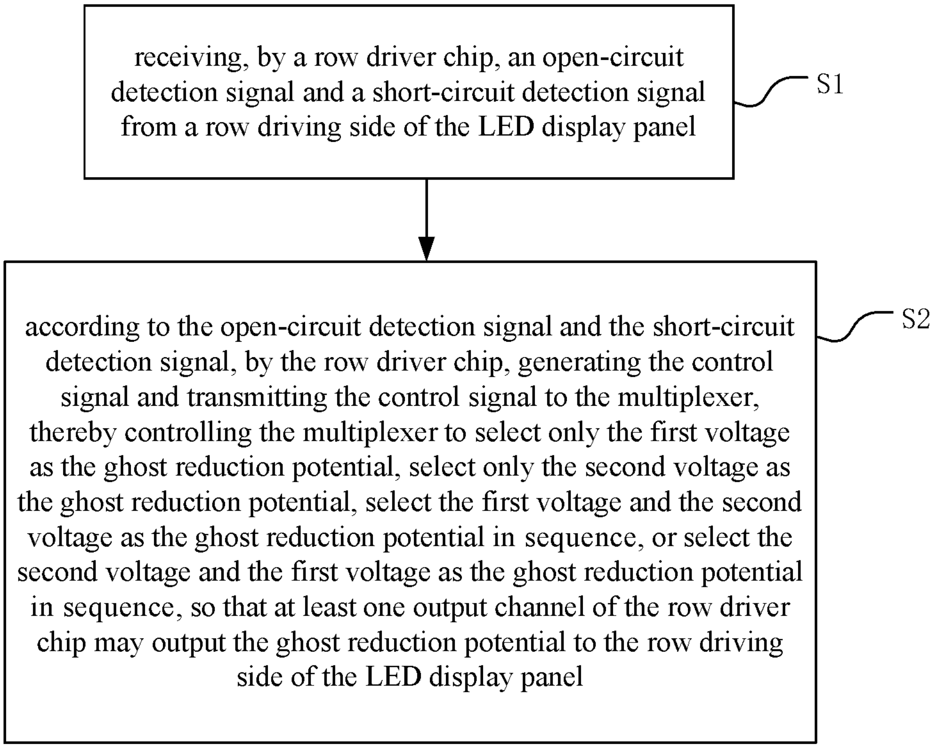
FIG. 7 shows a flowchart of a method for adjusting a ghost reduction potential according to an embodiment of the present disclosure.

FIG. 7 shows a flow diagram of a method for adjusting a ghost reduction potential provided according to an embodiment of the present disclosure. As shown in FIG. 6, the flow of the method firstly executes Step S1: receiving, by a row driver chip, an open-circuit detection signal and a short-circuit detection signal from a row driving side of the LED display panel. Next, the flow of the method executes Step S2: according to the open-circuit detection signal and the short-circuit detection signal, by the row driver chip, generating the control signal and transmitting the control signal to the multiplexer, thereby controlling the multiplexer to select only the first voltage as the ghost reduction potential, select only the second voltage as the ghost reduction potential, select the first voltage and the second voltage as the ghost reduction potential in sequence, or select the second voltage and the first voltage as the ghost reduction potential in sequence, so that at least one output channel of the row driver chip may output the ghost reduction potential to the row driving side of the LED display panel.

Wherein, if a difference between a scanning voltage $V_{DD}$ and an original voltage of the ghost reduction potential is larger than a forward turn-on voltage Vf of an LED component, the short-circuit detection signal can be generated. If an output voltage Vout of a corresponding output channel is less than the forward turn-on voltage Vf of the LED component, the open-circuit detection signal can be generated.

In the technical proposal provided according to the above embodiment of the present disclosure, the row driver chip receives the open-circuit detection signal and the short-circuit detection signal from the row driving side of the LED display panel, generates, according to the open-circuit detection signal and the short-circuit detection signal, the control signal, and transmits the control signal to the multiplexer, thereby controlling the multiplexer to select only the first voltage as the ghost reduction potential, select only the second voltage as the ghost reduction potential, select the first voltage and the second voltage as the ghost reduction potential in sequence, or select the second voltage and the first voltage as the ghost reduction potential in sequence, so that at least one output channel of the row driver chip may output the ghost reduction potential to the row driving side of the LED display panel, which can effectively avoid open-circuit caterpillar phenomenon or short-circuit caterpillar phenomenon in the LED display panel.

Figure 8:
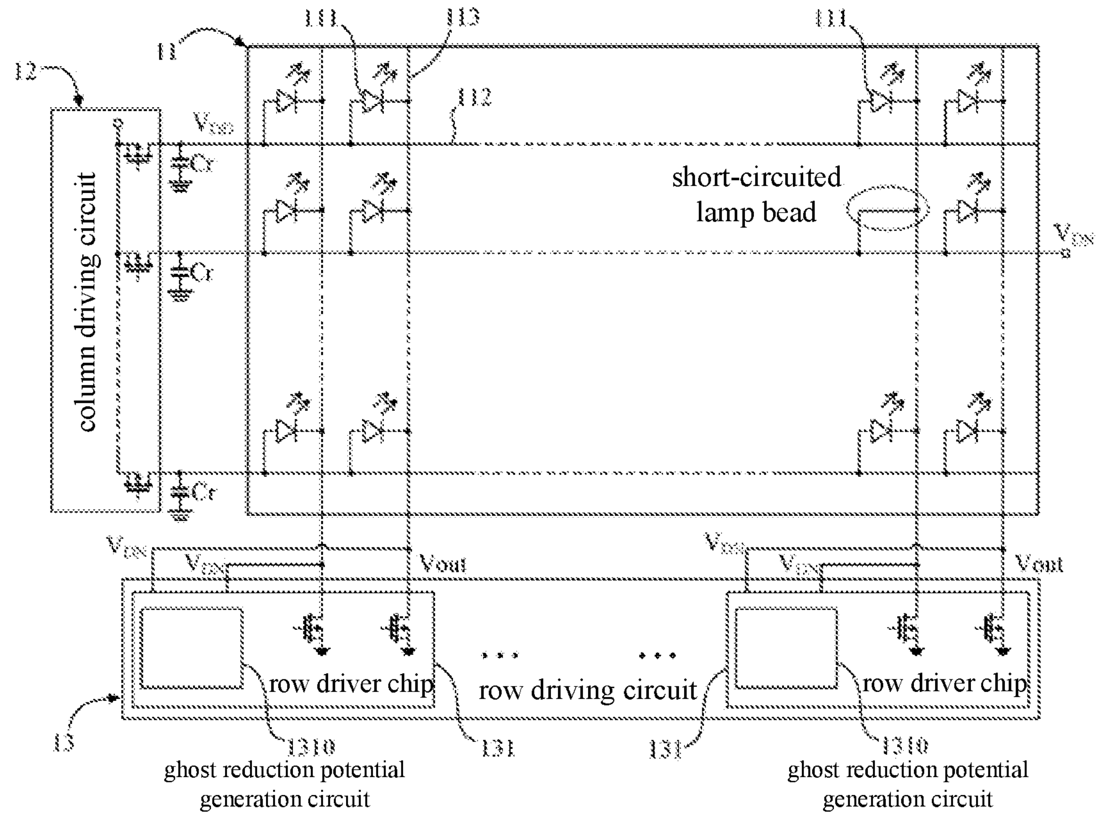
FIG. 8 shows a schematic diagram of eliminating short-circuit caterpillar phenomenon in an LED display panel by adopting a method for adjusting the ghost reduction potential according to an embodiment of the present disclosure.

FIG. 8 shows a schematic diagram of eliminating short-circuit caterpillar phenomenon in the LED display panel by adopting a method for adjusting the ghost reduction potential according to an embodiment of the present disclosure. When one or more LED component 111 of the LED display panel 11 is damaged, resulting in short-circuiting a lamp bead, other lamp beads which are arranged in a same row or column with that lamp bead (i.e., LED component 111) may be affected to produce erroneous dim light, this phenomenon is referred to as short-circuit caterpillar phenomenon in the industry. As shown in FIG. 8, when a lamp bead is short-circuited, an LED component 111 arranged in a same column with that lamp bead may form a path as shown in FIG. 8 when the row with that LED component is under scanning; at this time, if a voltage difference between potential point $V_{DD}$ and potential point $V_{DN}$, which has an original voltage of the ghost reduction potential, i.e., the ghost reduction potential before the short circuit is detected) is higher than a turn-on voltage of the LED component 111, long bright phenomenon will occur on that column. Therefore, when Step S2 of the corresponding embodiment of FIG. 7 is performed, the open-circuit detection signal and the short-circuit detection signal may indicate that short-circuit caterpillar phenomenon occurs in the LED display panel 11, at this time, the multiplexer 1312 can be controlled by the control signal Sel to select only the first voltage $V_{DNS}$ as the ghost reduction potential $V_{DN}$, and at least one output channel of the row driver chip 131 can transmit the ghost reduction potential to at least one unscanned row on the row driving side, thereby adjusting the potential of the at least one unscanned row to the ghost reduction potential $V_{DN}$, and $V_{DN}>V_{DD}$-Vf. Thus, short-circuit caterpillar phenomenon caused by at least one LED component, which is short-circuited, of the LED display panel can be suppressed or eliminated because the potential of the at least one unscanned row is adjusted to the ghost reduction potential $V_{DN}$ and $V_{DN}>V_{DD}$-Vf, where $V_{DD}$ is the scanning voltage, and Vf is the forward turn-on voltage of each LED component.

Figure 9:
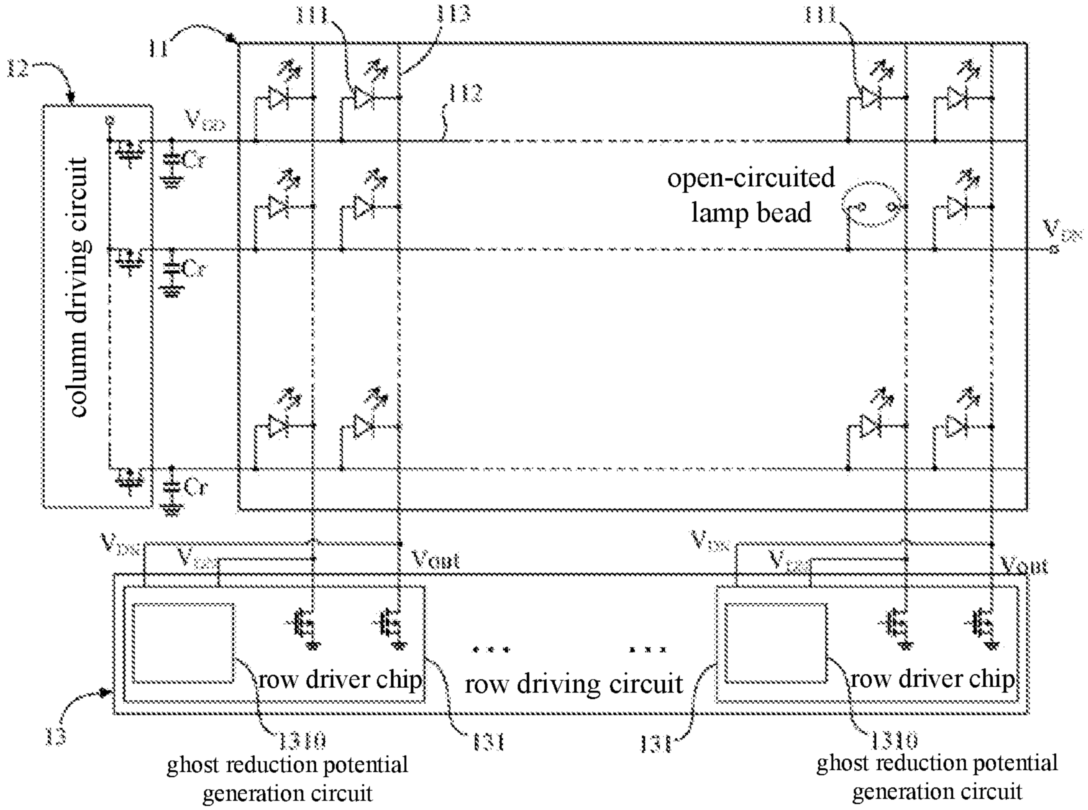
FIG. 9 shows a schematic diagram of eliminating open-circuit caterpillar phenomenon in an LED display panel by adopting a method for adjusting the ghost reduction potential according to an embodiment of the present disclosure.

FIG. 9 shows a schematic diagram of eliminating open-circuit caterpillar phenomenon in an LED display panel by adopting a method for adjusting a ghost reduction potential according to an embodiment of the present disclosure. When one or more LED component 111 of the LED display panel 11 is damaged, resulting in open-circuiting a lamp bead, other lamp beads which are arranged in a same row or column with that lamp bead (i.e., the LED component 111) may be affected to produce an erroneous dim light. This phenomenon is referred to as open-circuit caterpillar phenomenon in the industry. When open-circuit caterpillar phenomenon occurs, the output voltage Vout of the corresponding output channel of the row driver chip 131 may be pulled down to less than 0.5 V (i.e., less than Vf). Therefore, when Step S2 of the corresponding embodiment of FIG. 7 is performed, the open-circuit detection signal and the short-circuit detection signal may indicate that open-circuit caterpillar phenomenon occurs in the LED display panel 11, at this time, the multiplexer 1312 can be controlled by the control signal Sel to select the second voltage $V_{DNO}$ as the ghost reduction potential $V_{DN}$, and at least one output channel of the row driver chip 131 can transmit the ghost reduction potential $V_{DN}$ to at least one unscanned row on the row driving side, thereby adjusting the potential of the at least one unscanned row to the ghost reduction potential $V_{DN}$, and $V_{DN}$<Vout Vf. Thus, the open-circuit caterpillar phenomenon caused by at least one LED component, which is open-circuited, of the LED display panel can be suppressed or eliminated because the potential of the at least one unscanned row is adjusted to the ghost reduction potential $V_{DN}$ and $V_{DN}$<Vout Vf, where Vout is the output voltage of the corresponding output channel.

Figure 10:
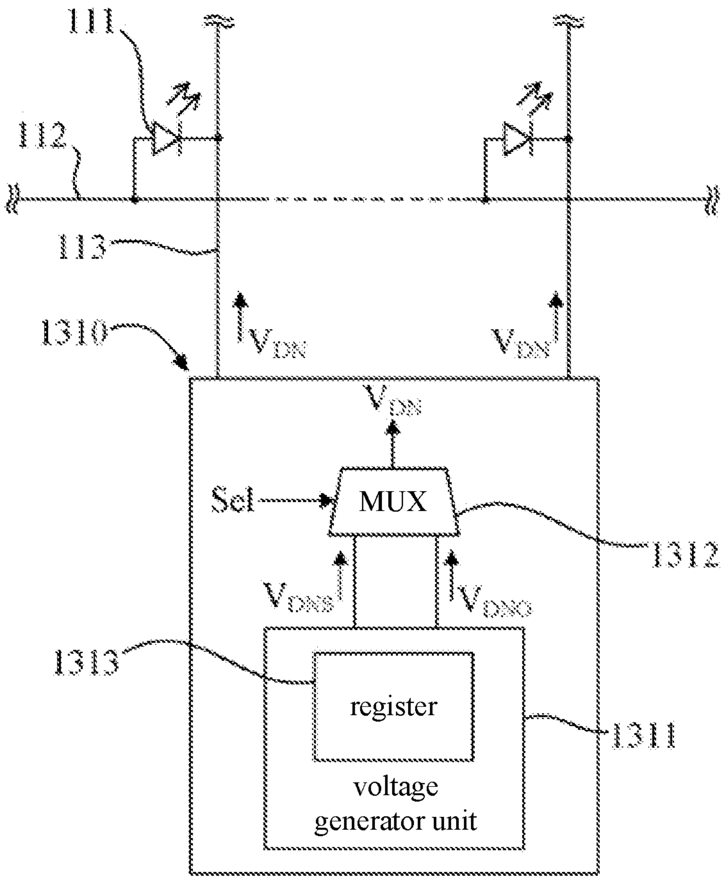
FIG. 10 shows a structural schematic diagram of the ghost reduction voltage generation circuit according to another embodiment of the present disclosure.

FIG. 10 shows a structural schematic diagram of a ghost reduction potential generation circuit provided according to another embodiment of the present disclosure. As shown in FIG. 10, the ghost reduction potential generation circuit 1310 may further include a register 1313, which is arranged in the voltage generator unit 1311 and configured to register the first voltage $V_{DNS}$ and the second voltage $V_{DNO}$ It should be noted that priorities of the first voltage $V_{DNS}$ and the second voltage $V_{DNO}$ may be stored in the register 1313, so that the multiplexer 1312 may sequentially select the first voltage and the second voltage as the ghost reduction potential according to a predetermined priority.

In an embodiment, based on this configuration, the row driver chip 131 can preferentially eliminate short-circuit caterpillar phenomenon. When short-circuit caterpillar phenomenon is detected in the LED display panel 11, the multiplexer 1312 may select the first voltage $V_{DNS}$ from the register 1313 as the ghost reduction potential $V_{DN}$, so that at least one output channel of the row driver chip 131 can transmit the ghost reduction potential to at least one unscanned row on the row driving side, thereby adjusting the potential of the at least one unscanned row to the ghost reduction potential $V_{DN}$, and $V_{DN}>V_{DD}$-Vf.

In an embodiment, when the register 1313 is used, the row driver chip can also be configured to preferentially eliminate open-circuit caterpillar phenomenon by default. When open-circuit caterpillar phenomenon is detected in the LED display panel 11, the multiplexer 1312 may select the second voltage $V_{DNO}$ from the register 1313 as the ghost reduction potential $V_{DN}$, so that at least one output channel of the row driver chip 131 can transmit the ghost reduction potential to at least one unscanned row on the row driving side, thereby adjusting the potential of the at least one unscanned row to the ghost reduction potential $V_{DN}$, and $V_{DN}$<Vout Vf. The register 1313 here may serve as a data buffer, and the multiplexer 1312 may serve as a data selector. Under the control of the control signal Sel, the multiplexer 1312 may select desired data from the data buffer and then output the selected desired data.

In an embodiment, when the register 1313 is used, the row driver chip 131 can also be configured to eliminate open-circuit caterpillar phenomenon and short-circuit caterpillar phenomenon in sequence by default. Specifically, if the priority of the second voltage is higher than the priority of the first voltage, then the multiplexer 1312 can be controlled to select the second voltage $V_{DNO}$ from the register 1313 by using the control signal Sel, so that at least one output channel of the row driver chip 131 can transmit the ghost reduction potential to at least one unscanned row on the row driving side, thereby adjusting the potential of the at least one unscanned row to the ghost reduction potential $V_{DN}$, where $V_{DN}$<Vout+Vf, so as to eliminate open-circuit caterpillar phenomenon. Then, the multiplexer 1312 can be controlled by the control signal Sel to select the first voltage $V_{DNS}$ from the register 1313, so that at least one output channel of the row driver chip 131 can transmit the ghost reduction potential to at least one unscanned row on the row driving side, thereby adjusting the potential of the at least one unscanned row to the ghost reduction potential $V_{DN}$, where $V_{DN}>V_{DD}$-Vf, so as to eliminate short-circuit caterpillar phenomenon.

In an embodiment, when the register 1313 is used, the row driver chip 131 can be configured to eliminate short-circuit caterpillar phenomenon and open-circuit caterpillar phenomenon in sequence by default. Specifically, if the priority of the first voltage is higher than the priority of the second voltage, then, the control signal Sel can be used to control the multiplexer 1312 to select the first voltage $V_{DNS}$ from the register 1313, so that at least one output channel of the row driver chip 131 can transmit the ghost reduction potential to at least one unscanned row on the row driving side, thereby adjusting the potential of the at least one unscanned row to the ghost reduction potential $V_{DN}$, where $V_{DN}>V_{DD}$-Vf, so as to eliminate short-circuit caterpillar phenomenon. Then, the multiplexer 1312 is controlled by the control signal Sel to select the second voltage $V_{DNO}$ from the register 1313, so that at least one output channel of the row driver chip 131 can transmit the ghost reduction potential to at least one unscanned row on the row driving side, thereby adjusting the potential of the at least one unscanned row to the ghost reduction potential $V_{DN}$, where $V_{DN}<$Vout+Vf, so as to eliminate open-circuit caterpillar phenomenon.

According to embodiments of the present disclosure, a row driving circuit is also provided, and comprises at least one row driver chip, each of which comprises a ghost reduction potential generation circuit; the row driving circuit is configured to perform the method for adjusting the ghost reduction potential provided according to embodiments of the present disclosure.

The foregoing only describes a preferred embodiment of the present invention and is not configured to limit the invention which may be subject to various modifications and variations to those skilled in the art. Any modifications, equivalents, improvements, etc. made within the spirit and principles of the present disclosure shall be included within the protection scope of the present invention.

INDUSTRIAL PRACTICALITY

The present disclosure provides a method for adjusting a ghost reduction potential, a row driving circuit and an LED display device, which can effectively avoid open-circuit caterpillar phenomenon or short-circuit caterpillar phenomenon in the LED display panel.

What is claimed is:

1. A method for adjusting a ghost reduction potential, wherein the method is realized by a row driving circuit comprising at least one row driver chip, each of which comprises a ghost reduction potential generation circuit configured to generate a first voltage and a second voltage; the ghost reduction potential generation circuit comprises a multiplexer; the method comprises:

receiving, by the at least one row driver chip, an open-circuit detection signal and a short-circuit detection signal from a row driving side of an LED display panel; and according to the open-circuit detection signal and the short-circuit detection signal, by the at least one row driver chip, generating a control signal and transmitting the control signal to the multiplexer, so as to control the multiplexer to select only the first voltage as the ghost reduction potential, select only the second voltage as the ghost reduction potential, select the first voltage and the second voltage as the ghost reduction potential in sequence, or select the second voltage and the first voltage as the ghost reduction potential in sequence, wherein at least one output channel of the at least one row driver chip is configured to output the ghost reduction potential to the row driving side of the LED display panel, wherein the open-circuit detection signal is generated for indicating that one or more LED component is affected by an open-circuit caterpillar phenomenon, when an output voltage of a corresponding one of the at least one output channel is detected to be less than a forward turn-on voltage of each LED component, wherein cathodes of corresponding LED components in the LED display panel are directly connected to a corresponding row driving line which has an output end at the row driving side of the LED display panel, wherein the output end of the corresponding row driving line is directly connected to a first current terminal of a corresponding MOS transistor that has a second current terminal directly connected to ground, and an output terminal of the multiplexer is directly connected to the output end of the corresponding row driving line to apply the ghost reduction potential to the cathodes of corresponding LED components.

2. The method according to claim 1, wherein the ghost reduction potential generation circuit further comprises a voltage generator unit which is coupled with two signal input terminals of the multiplexer, and is configured to generate the first voltage and the second voltage and transmit the first voltage and the second voltage to the two signal input terminals, respectively.

3. The method according to claim 1, wherein the at least one output channel of the at least one row driver chip is configured to transmit the ghost reduction potential to at least one unscanned row on the row driving side, so as to adjust a potential of each of the at least one unscanned row to the ghost reduction potential, thus eliminating short-circuit caterpillar phenomenon caused by at least one LED component which is short-circuited in the LED display panel, wherein, $V_{DN}>V_{DD}-$Vf, $V_{DN}$ is the ghost reduction potential, $V_{DD}$ is a scanning voltage, and Vf is a forward turn-on voltage of each LED component.

4. The method according to claim 1, wherein the multiplexer is controlled by the control signal to select only the first voltage as the ghost reduction potential when the open-circuit detection signal and the short-circuit detection signal indicate that only short-circuit caterpillar phenomenon exists in the LED display panel.

5. The method according to claim 1, wherein the multiplexer is controlled by the control signal to select only the second voltage as the ghost reduction potential when the open-circuit detection signal and the short-circuit detection signal indicate that only open-circuit caterpillar phenomenon exists in the LED display panel.

6. The method according to claim 5, wherein the multiplexer is controlled by the control signal to select the first voltage and the second voltage as the ghost reduction potential in a sequence according to a predetermined priority when the open-circuit detection signal and the short-circuit detection signal indicate that short-circuit caterpillar phenomenon and open-circuit caterpillar phenomenon simultaneously exist in the LED display panel.

7. The method according to claim 6, wherein if a priority of the first voltage is higher than a priority of the second voltage, the multiplexer is controlled by the control signal to select the first voltage and the second voltage as the ghost reduction potential in sequence when the open-circuit detection signal and the short-circuit detection signal indicate that short-circuit caterpillar phenomenon and open-circuit caterpillar phenomenon simultaneously exist in the LED display panel.

8. The method according to claim 6, wherein if a priority of the second voltage is higher than a priority of the first voltage, the multiplexer is controlled by the control signal to select the second voltage and the first voltage as the ghost reduction potential in sequence when the open-circuit detection signal and the short-circuit detection signal indicate that short-circuit caterpillar phenomenon and open-circuit caterpillar phenomenon simultaneously exist the LED display panel.

9. The method according to claim 1, wherein the short-circuit detection signal is generated if a difference between the scanning voltage and an original voltage of the ghost reduction potential is larger than a forward turn-on voltage of each LED component.

10. A row driving circuit, comprising at least one row driver chip, each of which comprises a ghost reduction potential generation circuit, wherein the row driving circuit is configured to perform the method for adjusting the ghost reduction potential according to claim 1.

11. The row driving circuit according to claim 10, wherein the ghost reduction potential generation circuit further comprises a voltage generator unit which is coupled to two signal input terminals of the multiplexer and is configured to generate the first voltage and the second voltage and transmit the first voltage and the second voltage to the two signal input terminals, respectively.

12. The row drive circuit according to claim 10, wherein the ghost reduction potential generation circuit further comprises a register configured to register the first voltage and the second voltage.

13. An LED display device, comprising an LED display panel, a column driving circuit, a row driving circuit, and a display controller; wherein, the row driving circuit comprises at least one row driver chip, each of which comprises a ghost reduction potential generation circuit; the row driving circuit is configured to perform the method for adjusting the ghost reduction potential according to claim 1.

14. The method according to claim 1, wherein the multiplexer is configured to select the first voltage or the second voltage as the ghost reduction potential, which is applied to at least one unscanned row on the row driving side, and is different from a power supply voltage for scanning a target row.

15. The method according to claim 1, wherein the at least one output channel of the at least one row driver chip is configured to transmit the ghost reduction potential to at least one unscanned row on the row driving side, so as to adjust a potential of each of the at least one unscanned row to the ghost reduction potential, thus eliminating open-circuit caterpillar phenomenon caused by at least one LED component which is open-circuited in the LED display panel, wherein $V_{DN}$<Vout+Vf, $V_{DN}$ is the ghost reduction potential, Vout is an output voltage of a corresponding one of the at least one output channel, and Vf is a forward turn-on voltage of each LED component.

16. The method according to claim 1, wherein the cathodes of corresponding LED components are directly connected to the first current terminal of the corresponding MOS transistor without passing through the multiplexer.

17. The method according to claim 1, wherein the ghost reduction potential generation circuit further comprises a register configured to register the first voltage and the second voltage, wherein the first voltage is a predetermined voltage greater than a difference between $V_{DD}$ and Vf, and the second voltage is a predetermined voltage lower than a sum of Vout and Vf, where $V_{DD}$ is a scanning voltage, Vout is an output voltage of a corresponding one of the at least one output channel, and Vf is a forward turn-on voltage of each LED component.

* * * * *